(12) United States Patent
Hibi et al.

(10) Patent No.: US 7,578,896 B2
(45) Date of Patent: *Aug. 25, 2009

(54) PRODUCTION METHOD OF MULTILAYER CERAMIC ELECTRONIC DEVICE

(75) Inventors: Takako Hibi, Tokyo (JP); Yukie Nakano, Tokyo (JP); Shunichi Yuri, Tokyo (JP); Takahiro Ushijima, Tokyo (JP); Akira Sato, Tokyo (JP); Wataru Takahara, Tokyo (JP); Masako Yoshii, Akita-ken (JP)

(73) Assignee: TDK Corporation, Tokyo (JP)

( * ) Notice: Subject to any disclaimer, the term of this patent is extended or adjusted under 35 U.S.C. 154(b) by 114 days.

This patent is subject to a terminal disclaimer.

(21) Appl. No.: 11/896,060

(22) Filed: Aug. 29, 2007

(65) Prior Publication Data
US 2008/0006365 A1    Jan. 10, 2008

Related U.S. Application Data

(63) Continuation of application No. 10/296,993, filed as application No. PCT/JP02/03657 on Apr. 12, 2002, now Pat. No. 7,276,130.

(30) Foreign Application Priority Data

Apr. 12, 2001  (JP) ............................. 2001-113425
Apr. 27, 2001  (JP) ............................. 2001-131712

(51) Int. Cl.
*C03B 29/00*  (2006.01)
*H01G 4/06*  (2006.01)
*H01C 7/12*  (2006.01)
*C04B 35/00*  (2006.01)

(52) U.S. Cl. .............. 156/89.12; 156/89.14; 361/321.1; 361/321.2; 361/118; 501/139

(58) Field of Classification Search .............. 156/89.14, 156/89.12; 361/321.1, 321.2, 118; 501/139
See application file for complete search history.

(56) References Cited

U.S. PATENT DOCUMENTS 4,607,316 A    8/1986   Wada et al.

(Continued)

FOREIGN PATENT DOCUMENTS

EP      1 043 739 A1    10/2000

(Continued)

OTHER PUBLICATIONS

Noi et al., "Multilayer Chip Varistors", National Technical Report, vol. 39, No. 2, pp. 155-162 Apr. 1993.

*Primary Examiner*—Philip C Tucker
*Assistant Examiner*—Alex Efta
(74) *Attorney, Agent, or Firm*—Oliff & Berridge, PLC

(57) ABSTRACT

A method of producing a multilayer ceramic electronic device, having a firing step for firing a pre-firing element body wherein a plurality of dielectric layers and internal electrode layers containing a base metal are alternately arranged, characterized in that the firing step has a temperature raising step for raising a temperature to a firing temperature, and hydrogen is continued to be introduced from a point in time of the temperature raising step. According to the method, it is possible to provide a method of producing a multilayer ceramic electronic device, such as a multilayer ceramic capacitor, wherein shape anisotropy and other structural defaults are hard to occur and electric characteristics are improved while suppressing deterioration thereof even if dielectric layers becomes thinner and stacked more.

8 Claims, 2 Drawing Sheets

U.S. PATENT DOCUMENTS

| | | | |
|---|---|---|---|
| 4,809,131 | A | 2/1989 | Chazono et al. |
| 5,004,715 | A | 4/1991 | Hakotani et al. |
| 5,014,158 | A | 5/1991 | Nishimura et al. |
| 5,082,606 | A | 1/1992 | Rotman et al. |
| 5,097,391 | A | 3/1992 | Nomura et al. |
| 5,166,859 | A | 11/1992 | Ueno et al. |
| 5,230,846 | A | 7/1993 | Tamhankar et al. |
| 5,266,079 | A | 11/1993 | Iga |
| 5,858,901 | A | 1/1999 | Chu et al. |
| 5,889,647 | A | 3/1999 | Hansen et al. |
| 6,403,513 | B1 | 6/2002 | Sato et al. |
| 6,645,895 | B2 | 11/2003 | Sato et al. |
| 2003/0147194 | A1* | 8/2003 | Hibi et al. .................. 361/118 |

FOREIGN PATENT DOCUMENTS

| | | |
|---|---|---|
| JP | A-63-126117 | 5/1988 |
| JP | A-5-283278 | 10/1993 |
| JP | A-6-45182 | 2/1994 |
| JP | A-06-196352 | 7/1994 |
| JP | A-6-342735 | 12/1994 |
| JP | A-8-167536 | 6/1996 |
| JP | A-9-134842 | 5/1997 |
| JP | A-9-227239 | 9/1997 |
| JP | A-10-335169 | 12/1998 |
| JP | A-11-283860 | 10/1999 |
| JP | B2-3114462 | 9/2000 |
| JP | A-2000-281435 | 10/2000 |
| JP | A-2001-97773 | 4/2001 |
| JP | B2-3250400 | 11/2001 |

* cited by examiner

PRODUCTION METHOD OF MULTILAYER CERAMIC ELECTRONIC DEVICE

This is a Continuation of application Ser. No. 10/296,993 now U.S. Pat. No. 7,276,130 filed Dec. 2, 2002 which is a National Stage of PCT/JP/02/03657 filed Apr. 12, 2002. The disclosures of the prior applications are hereby incorporated by reference herein in their entirety.

TECHNICAL FIELD

The present invention relates to a method of producing a multilayer ceramic electronic device, such as a multilayer ceramic capacitor.

BACKGROUND ART

A multilayer ceramic capacitor as an example of multilayer ceramic electronic devices is produced by alternately stacking, for example, ceramic green sheets and internal electrode layers having a predetermined pattern, then making the same one body to obtain a green chip and simultaneously firing the green chip.

The internal electrode layers of the multilayer ceramic capacitor as above are made to be one body with ceramic dielectrics by firing, so it has been necessary to select materials not reacting with ceramic dielectrics.

Conventionally, platinum, palladium and other precious metals have been used as materials for composing internal electrode layers. However, since precious metals are expensive, it has been a cause of high costs of produced capacitors.

While, in recent years, it became possible to use nickel and other inexpensive base metals as materials composing internal electrodes and a wide reduction of the costs has realized.

Conventionally, a variety of proposals have made on dielectric ceramic compositions wherein an inexpensive base metal can be used as a material of internal electrodes. For example, in the Japanese Unexamined Patent Publication No. 6-45182, a dielectric ceramic composition wherein a dielectric oxide (note that $0 \leq x \leq 0.25$, $0 \leq y \leq 0.05$, $0.1 \leq z \leq 0.3$, $1.000 \leq m \leq 1.020$) indicated by a composition formula $[(Ba_{1-x-y}Ca_xSr_y)O]_m(Ti_{1-z}Zr_z)O_2$ is a main component is disclosed. In the Japanese Unexamined Patent Publication No. 6-342735, a dielectric ceramic composition wherein $BaTiO_3$ is a main component is disclosed. In the Japanese Unexamined Patent Publication No. 10-335169, a dielectric ceramic composition wherein a dielectric oxide (note that $0 \leq x \leq 1.00$, $0.9 \leq y \leq 1.00$, $0.75 \leq m \leq 1.04$) indicated by a composition formula $(Sr_{1-x}Ca_x)_m(Ti_{1-y}Zr_y)O_3$ is a main component is disclosed.

On the other hand, along with electronic devices getting more compact in recent years, a more compact and larger capacity multilayer ceramic capacitor has been demanded. To realize a more compact larger capacity multilayer ceramic capacitor, it is necessary to make a thickness of one dielectric layer as thin as possible and to increase the number of layers to be stacked in a predetermined size as much as possible (stacking more layers).

However, as dielectric layers get thinner and stacked more, a shape of an obtained ceramic capacitor is liable to cause anisotropy. When anisotropy arises in a shape of a capacitor, tractability at the time of mounting the capacitor on a substrate, etc. declines.

Also, as dielectric layers get thinner and stacked more, electric characteristics, such as static capacitance and insulation resistance, have been also liable to decline.

Furthermore, as dielectric layers get thinner and stacked more, cracks (particularly, inner cracks) have been liable to occur in an obtained capacitor. When a crack arises inside a capacitor, it cannot endure to be used as a capacitor.

DISCLOSURE OF INVENTION

A first object of the present invention is to provide a method of producing a multilayer ceramic capacitor and other multilayer ceramic electronic devices wherein structural defaults, such as shape anisotropy, hardly arise, capable of improving electric characteristics and suppressing deterioration thereof.

A second object of the present invention is to provide a method of producing a multilayer ceramic capacitor and other multilayer ceramic electronic devices having dielectric layers of a certain composition by which an occurrence of cracks and other structural defaults are suppressed even when the dielectric layers get thinner and stacked more.

To attain the first object, according to a first aspect (a first invention) of the present invention, there is provided a method of producing a multilayer ceramic electronic device, having a firing step for firing a pre-firing element body wherein a plurality of dielectric layers and internal electrode layers containing a base metal are alternately arranged, characterized in that the firing step has a temperature raising step for raising a temperature to a firing temperature; and hydrogen is continued to be introduced from a point in time of the temperature raising step.

To attain the second object, according to a second aspect (a second invention) of the present invention, there is provided a method of producing a multilayer ceramic electronic device including a firing step for firing a pre-firing element body, wherein a plurality of dielectric layers containing a material indicated by a composition formula $\{(Sr_{1-x}Ca_x)O\}_m \cdot (Ti_{1-y}Zr_y)O_2$, wherein m, x and y indicating respective mole ratios in the composition formula have a relationship of $0.75 \leq m < 1.08$, $0 \leq x \leq 1.00$ and $0.5 \leq y \leq 1.00$, and internal electrode layers containing a base metal are alternately arranged, wherein the firing step includes a temperature raising step for raising a temperature to a firing temperature; and hydrogen is continued to be introduced from a point in time of the temperature raising step.

In both of the first and second inventions, it is sufficient to raise the temperature to a firing temperature in the temperature raising step and a process thereof is not particularly limited. For example, it may be raised at a predetermined temperature raising rate to reach the firing temperature, or after raising the temperature once to be a predetermined temperature (for example, lower than the firing temperature) and lowering the temperature (for example, to the room temperature), introduction of the hydrogen may be performed as above to raise to the firing temperature for perform firing.

Note that both of the first and second inventions normally further include a step of removing a binder before the above firing step.

When raising the temperature to a predetermined temperature (for example, lower than the firing temperature) and lowering from the predetermined temperature (for example, to the room temperature), then introducing hydrogen to raise to the firing temperature so as to perform firing, the predetermined temperature is preferably 1000° C. or more in the first invention and more than 800° C. in the second invention.

Both in the first and second inventions, a wet nitrogen gas is preferably introduced as an atmosphere gas before introducing hydrogen. Accordingly, an atmosphere gas after introducing hydrogen is a mixed gas atmosphere of wet nitrogen and hydrogen.

In the first invention, the temperature of introducing hydrogen is preferably 1000° C. or more in the first invention, while more than 800° C., more preferably 1050° C. or more in the second invention.

Both in the first and second inventions, the temperature of introducing hydrogen is preferably lower than the above firing temperature.

In the first invention, an atmosphere temperature may be raised at a predetermined raising rate after introducing hydrogen, or the atmosphere temperature may be raised at a predetermined rate after keeping it at the atmosphere temperature at the time of introducing hydrogen for a predetermined time.

In the first invention, a method of introducing hydrogen is not particularly limited and, for example, hydrogen of a predetermined concentration may be introduced from the beginning of the introduction or the hydrogen concentration to be introduced may be gradually changed.

In both of the first and second inventions, it is preferable that hydrogen is introduced so that a difference of oxygen partial pressures before and after the hydrogen introduction becomes 6 digits or more at the hydrogen introduction temperature.

In both of the first and second inventions, the above firing step may further includes a temperature holding step for holding the firing temperature and a temperature lowering step for lowering from the firing temperature and hydrogen introduction may be stopped from a point in time of the temperature lowering step. When stopping the hydrogen introduction from a point in time of the lowering step, a temperature at the time of stopping the hydrogen introduction is preferably 1100° C. or less in the first invention, while 1200° in the second invention.

In both of the first and second inventions, the above pre-firing element body preferably has 50 or more dielectric layers.

In both of the first and second inventions, the base metal is preferably nickel or a nickel alloy.

In the first invention, the above dielectric layer preferably has a main component containing $BaTiO_3$. In the first invention, it is also preferable that the above dielectric layer has a main component containing $(BaCa)(TiZr)O_3$.

In both of the first and second inventions, it is preferable that the above multilayer ceramic electronic device is a multilayer ceramic capacitor.

OPERATION AND EFFECTS OF INVENTION

Conventionally, when producing a multilayer ceramic electronic device, such as a multilayer ceramic capacitor, an oxygen partial pressure was accurately controlled under a mixed gas atmosphere of wet nitrogen and hydrogen from an initial stage (around the room temperature) of a temperature raising step in a step of firing a pre-firing element body, such as a green chip, having dielectric layers and internal electrode layers. Namely, by introducing hydrogen from the initial stage of the temperature raising step, the oxygen partial pressure was kept low to strengthen a reducing state, and thereby, oxidization of a base metal (for example, Ni, etc.) contained in the internal electrode was prevented.

On the other hand, in the first invention, when firing the pre-firing element body, hydrogen is continued to be introduced from a point in time of the temperature raising step for raising to the firing temperature. On the hydrogen introduction, the oxygen partial pressure abruptly changes (preferably, 6 digits or more) and the reducing state becomes stronger comparing with that before the hydrogen introduction.

In the temperature raising step before the hydrogen introduction, the base metal contained in the internal electrode becomes oxidized. In the first invention, the temperature is raised without introducing hydrogen until the base metal contained in the internal electrode becomes oxidized, and then, hydrogen is introduced to reduce the oxidized base metal. Therefore, improvement effects in a variety of characteristics can be obtained according to the first invention. For example, effects of increasing the dielectric constant (static capacitance), improving defaults of the insulation resistance (IR), and suppressing structural defaults, such as suppressing an expansion in the direction of stacked layers which is noticeable when the number of layers is great, can be mentioned.

Namely, according to the first invention, it is possible to provide a method of producing a multilayer ceramic capacitor and other multilayer ceramic electronic devices wherein structural defaults, such as shape anisotropy, are hardly caused even when dielectric layers become thinner and stacked more, moreover, electric characteristics are improved while suppressing deterioration thereof.

Also, in the conventional firing method explained above, since different materials, that is, dielectrics and internal electrodes were fired at a time, a stress caused by a difference of contraction behaviors and difference of contraction percentages was generated inside the multilayer ceramic electronic device. Due to the stress, cracks were caused in the multilayer ceramic electronic devices in some cases.

On the other hand, it is characterized in the second invention that when firing a pre-firing element body having dielectric layers of a specific composition, hydrogen is continued to be introduced from a point in time of the temperature raising step for raising to a firing temperature.

By introducing hydrogen from a point in time of the temperature raising step, sintering of internal electrodes and valid dielectric layers sandwiched by the internal electrodes is respectively accelerated from a point in time of the temperature raising step. A ceramic dielectric subjected to a sintering process as such gains more plasticity in the temperature holding step for holding the firing temperature for a predetermined time, consequently, a stress inside the chip generated during the steps of the temperature raising to the temperature holding can be easily released. As a result, it is possible to produce a multilayer ceramic electronic device having dielectric layers of a specific composition wherein an occurrence of structural defaults, such as cracks, can be suppressed.

Namely, according to the second invention, it is possible to provide a method of producing a multilayer ceramic capacitor and other multilayer ceramic electronic devices having dielectric layers of a specific composition wherein structural defaults, such as cracks, are hardly caused even if the dielectric layer becomes thinner and stacked more.

Note that in the Japanese Unexamined Patent Publication No. 5-283278, it is disclosed that by changing a water temperature of a wetter from a point in time of a temperature raising step for raising to a firing temperature under a mixed gas atmosphere of wet nitrogen and hydrogen at the time of firing a pre-firing element body, an oxygen partial pressure under the mixed gas atmosphere of wet nitrogen and hydrogen is lowered. The wetter indicates water for humidifying used for producing a mixed gas atmosphere of wet nitrogen and hydrogen.

In the technique described in the Publication, however, hydrogen is introduced from the beginning of the temperature raising step in order to prevent the base metal contained in internal electrodes from becoming oxidized, thus, a change of an oxygen partial pressure is very small, which is 3 digits or less even if the wetter temperature is changed.

Multilayer ceramic electronic devices to which the present invention can be applied are not particularly limited and multilayer ceramic capacitors, piezoelectric elements, chip varistors, chip thermisters, chip resistance and other surface-mounted device (SMD) chip type electronic devices can be mentioned.

BEST MODE FOR CARRYING OUT THE INVENTION

Figure 1:
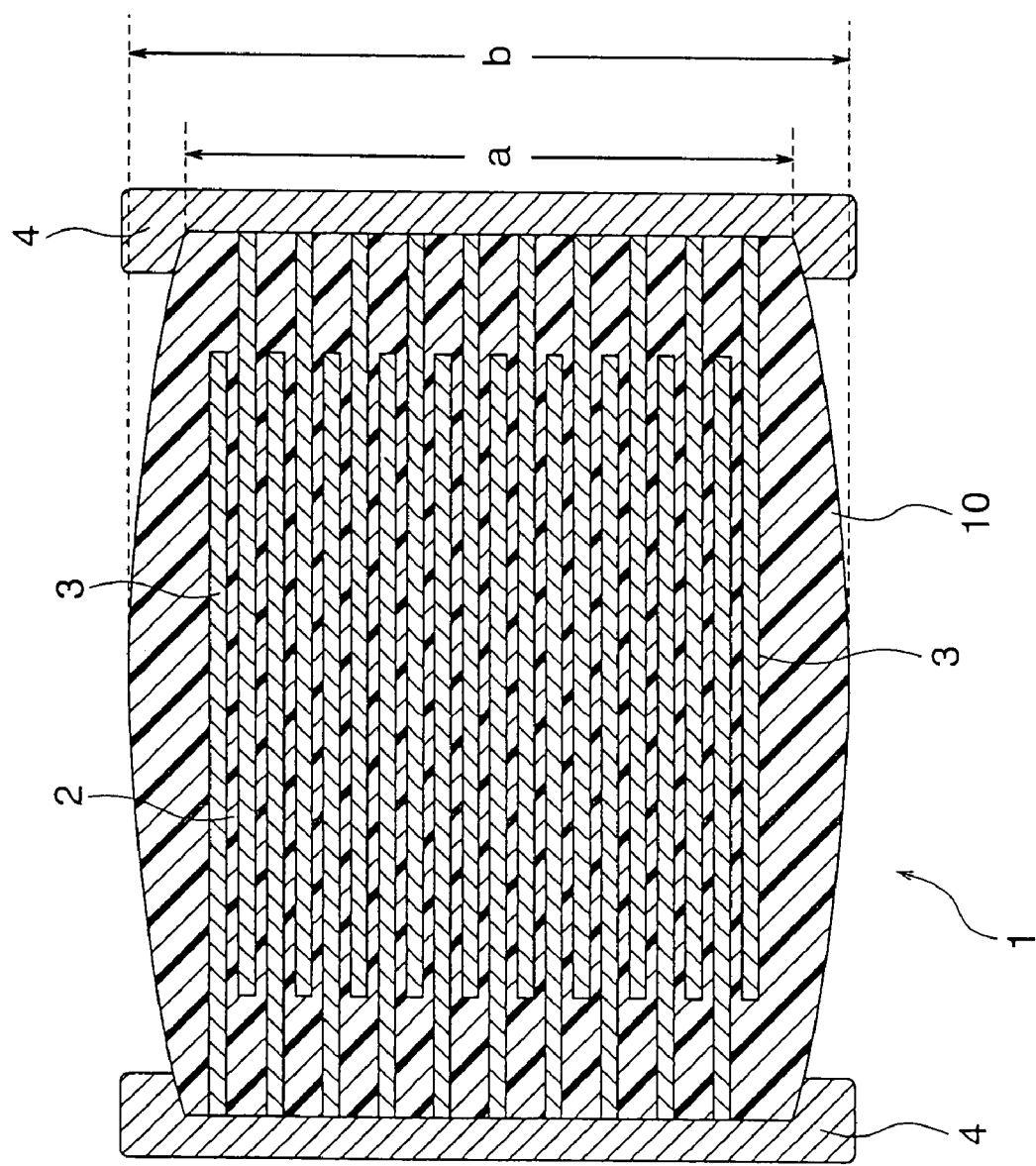
FIG. 1 is a cross-sectional view of a multilayer ceramic capacitor according to an embodiment of the present invention.

Below, the present invention will be explained based on an embodiment shown in the drawings.

First, a multilayer ceramic capacitor is explained as an example of multilayer ceramic electronic devices, and then, a production method thereof will be explained.

As shown in FIG. 1, a multilayer ceramic capacitor 1 as a multilayer ceramic electronic device comprises a capacitor element body 10 wherein a plurality of dielectric layers 2 and internal electrode layers 3 are alternately arranged. At both end portions of the capacitor element body 10 are formed a pair of external electrodes 4 respectively conductive with the plurality of internal electrode layers 3 alternately arranged inside the element body 10.

The internal electrode layers 3 are stacked so that the respective end surfaces alternately expose to surfaces of facing two end portions of the capacitor element body 10. The pair of external electrodes 4 are formed at both end portions of the capacitor element body 10 and connected to the exposed end surfaces of the alternately arranged internal electrode layers 3 to compose a capacitor circuit.

In the first invention, the dielectric layers 2 are not particularly limited and, for example, composed of a dielectric ceramic composition below.

In the first invention, the dielectric ceramic composition preferably has a main component containing, for example, calcium titanate, strontium titanate and/or barium titanate and has reducing resisting property. The main component preferably contains, for example, a dielectric oxide indicated by a composition formula $(Ba_{1-x}Ca_x)_A(Ti_{1-z}Zr_z)_BO_3$. In this case, A, B, x and z are all in any range and, for example, $0.95 < A/B < 1.02$, $0 \leq x \leq 1.00$ and $0 \leq z \leq 1.00$.

In the first invention, the dielectric ceramic composition may include a subcomponent containing at least one kind selected from oxides of Sr, Y, Gd, Tb, Dy, V, Mo, Zn, Cd, Ti, Sn, W, Ba, Ca, Mn, Mg, Cr, Si and P other than the above main component.

As a composition example of the dielectric layer 2, for example, an embodiment below can be mentioned.

First, as a main component, for example, a dielectric oxide having a composition indicated by $[(Ba_{1-x}Ca_x)O]_m(Ti_{1-z}Zr_z)O_2$ is used. In this case, x, z and m are preferably $0 \leq x \leq 0.25$, $0 \leq z \leq 0.3$ and $1.000 \leq m \leq 1.020$. In a main component as such, at least one kind selected from oxides of Mn, Y, V, Si and Mg and/or compounds which become oxides by firing is preferably included. More preferably, 0.01 to 0.5 wt % of an oxide of Mn and/or a compound which becomes an oxide by firing in a conversion of an oxide (MnO), 0.05 to 0.5 wt % of an oxide of Y and/or a compound which becomes an oxide by firing in a conversion of an oxide ($Y_2O_3$) and 0.005 to 0.3 wt % of an oxide of V and/or a compound which becomes an oxide by firing in a conversion of an oxide ($V_2O_5$) are preferably contained. Still more preferably, not more than 0.25 wt % of $SiO_2$ is further contained. Note that not more than about 0.5 wt % of a Mg oxide may be contained other than the above composition.

Secondary, as a main component, for example, $BaTiO_3$ is used. An atomic ratio (Ba/Ti ratio m) of Ba and Ti in this case is preferably $0.95 < m < 1.01$. At least one kind selected from oxides of Y, Si, Mg, Mn, Cr and V and/or compounds which become oxides by firing is preferably contained in a main composition as such. More preferably, with respect to 100 moles of $BaTiO_3$, 0.2 to 5 moles of $Y_2O_3$, 0.2 to 5 moles of $SiO_2$ and 0 to 3 moles of MgO are contained. Still more preferably, 0.2 to 5 moles of MnO or $Cr_2O_3$ is contained. Furthermore, it is preferable to contain not more than 0.2 mole of $V_2O_5$ is contained. Note that at least one kind of elements of Dy, Ho, Gd, Mo, Sr and Yb may be contained other than the above composition.

Note that in the first invention, the composition of the dielectric layers 2 is not limited to the above.

In the second invention, the dielectric layer 2 includes a dielectric ceramic composition below.

In the second invention, the dielectric ceramic composition has a main component containing a dielectric oxide indicated by a composition formula $\{(Sr_{1-x}Ca_x)O\}_m \cdot (Ti_{1-y}Zr_y)O_2$. At this time, an oxygen (O) amount may be slightly different from a stoichiometric composition of the above formula.

In the above composition formula, x is $0 \leq x \leq 1.00$. The x indicates the number of Ca atoms and by changing the x, that is, a Ca/Sr ratio, a capacity temperature coefficient and a specific dielectric constant can be freely controlled. Note that in the second invention, the ratio of Sr and Ca may be any and only one of the two may be contained.

In the above composition, y is $0.5 \leq y \leq 1.00$, preferably $0.93 \leq y \leq 1.00$. By making the y 0.5 or more, dependency on a frequency by a static capacitance and dielectric loss becomes small. The y indicates the number of Zr atoms, and reducing resistance tends to increase by replacing $ZrO_2$ which is hard to be reduced comparing with $TiO_2$.

In the above composition, the molar ratio m is $0.75 \leq m < 1.08$, preferably $0.75 \leq m \leq 1.04$ and still more preferably $0.970 \leq m \leq 1.030$. By making the m 0.75 or more, dependency on a frequency by a static capacitance and dielectric loss becomes small. By making the m less than 1.08, a fine sintered body can be obtained without heightening a firing temperature.

In the second invention, the dielectric ceramic composition may be added a predetermined amount of first subcomponent containing at least one selected from oxides of V, Nb, W, Ta and Mo and/or compounds which become oxides of them after firing. By adding a predetermined amount of such first subcomponent, firing at a low temperature becomes possible without deteriorating dielectric characteristics and an acceleration lifetime (high temperature load lifetime) of an insulation resistance can be improved even when the dielectric layers are made thinner. When adding the first subcomponent, a ratio of the first subcomponent with respect to 100 moles of the above main component is 0.01 mole $\leq$ first subcomponent $\leq$ 2 moles, preferably 0.02 mole $\leq$ first subcomponent $\leq$ 1.5 moles.

In the second invention, the dielectric ceramic composition may be added a predetermined amount of a second subcomponent containing an oxide of Mn (for example, MnO) and/or a compound (for example, $MnCO_3$) which becomes an oxide of Mn by firing. The second subcomponent has effects of accelerating sintering and giving reducing resistance. When adding the second subcomponent, the ratio of the second subcomponent with respect to 100 moles of the main component is 0 mole≦second subcomponent<10 moles, preferably 0.05 mole≦second subcomponent≦5 moles.

In the second invention, the dielectric ceramic composition may be added a predetermined amount of a third subcomponent containing at least one selected from $SiO_2$, MO (note that M is at least one element selected from Ba, Ca, Sr and Mg), $Li_2O$ and $B_2O_3$. The third subcomponent serves mainly as a sintering auxiliary agent. When adding the third subcomponent, the ratio of the third subcomponent with respect to 100 moles of the above main component is 0 mole<third subcomponent<15 moles, preferably 0.2 mole≦third subcomponent≦6 moles in a conversion of oxide.

In the second invention, a dielectric ceramic composition may be added a predetermined amount of fourth subcomponent containing oxides of R (note that R is at least one kind selected from Sc, Y, La, Ce, Pr, Nd, Pm, Sm, Eu, Gd, Tb, Dy, Ho, Er, Tm, Yb and Lu). The fourth subcomponent has an effect of reducing dependency on a frequency by a static capacitance and dielectric loss. In the case of adding the fourth subcomponent, the ratio of the fourth subcomponent with respect to 100 moles of the above main component is 0.02 mole≦fourth subcomponent<2 moles, preferably 0.02 mole≦fourth subcomponent≦0.6 mole.

The number of layers to be stacked, a thickness and other conditions of the respective dielectric layers 2 may be suitably determined in accordance with an object and use. The thickness of the respective dielectric layers 2 is 30 μm or less in the present embodiment, preferably 10 μm, more preferably 5 μm, still more preferably 3 μm and its lower limit is preferably 0.2 μm or so. The number of stacked layers in the dielectric layers 2 is preferably 50 or more, more preferably 100 or more and still more preferably 300 or more. Furthermore, the dielectric layer 2 is composed of grains and a grain boundary phase, and an average particle diameter of the grains of the dielectric layer 2 is preferably 0.1 to 5 μm or so. Normally, the grain boundary phase has as its components oxides of materials composing the dielectric material or the internal electrode material, oxides of separately added materials, furthermore, oxides of materials mixed in as impurities during the steps, and is composed of glass or vitreous material.

Conductive materials contained in the internal electrode layer 3 is not particularly limited and a base metal can be used when components of the dielectric layer 2 have reducing resisting property. As the base metal, nickel or a nickel alloy is preferable. A content of nickel in the alloy is preferably 90 wt % or more. Note that the nickel or nickel alloy may contain about 0.1 wt % or less of a variety of trace components, such as phosphorous, iron and magnesium. A thickness of the internal electrode layer 3 may be suitably determined in accordance with use, etc. and normally 0.5 to 5 μm and preferably 0.5 to 2 μm or so.

Materials of the external electrodes 4 are not particularly limited and normally copper, a copper alloy, nickel, a nickel alloy, etc. are used, but silver, an alloy of silver and palladium etc. can be also used. Also, a thickness of the external electrodes 4 is not limited and normally 10 to 50 μm or so.

A shape and size of the multilayer ceramic capacitor 1 may be suitably determined in accordance with an object and use, and the size is normally 0.6 to 5.7 mm in the lengthwise×0.3 to 5.0 mm in the crosswise×0.1 to 3.0 mm in height or so when the capacitor 1 is rectangular parallelpiped.

Particularly, when the multilayer ceramic capacitor 1 is produced by using a later explained firing method in the first invention, the shape does not cause any anisotropy. Specifically, assuming the maximum thickness of the multilayer ceramic capacitor 1 is b (refer to FIG. 1) and the minimum thickness is a (refer to FIG. 1) and a rate of difference of the thickness is calculated by a formula ($\{(b-a)/a\}\times100$), the value can be made smaller than that in the conventional capacitors and preferably the value can be made nearly 0%. A degree of anisotropy occurrence is changed in accordance with a composition and designs, such as the number of stacked layers and thickness, of the dielectric layers 2, and a value of the formula ($\{(b-a)/a\}\times100$) can be made 6% or less when a size of the capacitor element body 10 is, for example, 3.2 mm in lengthwise×1.6 mm in crosswise×0.6 mm in thickness, the number of layers of the dielectric layers 2 is 100, a thickness of the dielectric layers 2 is 4 μm and a thickness of the internal electrode layers 3 is 2 μm.

Note that in the conventional multilayer ceramic capacitor, 8% or so was the limit by the same size and the same composition system.

Also particularly, when the multilayer ceramic capacitor 1 is produced by using a later explained firing method in the second invention, an occurrence of cracks can be suppressed. Specifically, for example, in a multilayer ceramic capacitor having 330 dielectric layers and a size of 4.5 mm in lengthwise×3.2 mm in crosswise×2.3 mm in height or so, the crack occurrence rate can be suppressed to 90% or less, preferably 60% or less and more preferably 5% or less. Note that when producing a multilayer ceramic capacitor of the same size having 330 dielectric layers by using the conventional firing method, the crack occurrence rate was 100%.

The multilayer ceramic capacitor 1 according to the present embodiment can be produced by preparing a green chip by a normal printing method or sheet method using a paste, firing the same, then, printing or transferring an external electrode and firing.

An example of a production method of the multilayer ceramic capacitor 1 according to the present embodiment will be explained.

First, a dielectric layer paste, an internal electrode layer paste and an external electrode layer paste are prepared.

The dielectric layer paste is for forming the dielectric layers 2 (refer to FIG. 1) and composed of an organic solvent based paint or a water-soluble solvent based paint obtained by kneading dielectric materials and a binding agent.

As the dielectric materials, composite oxides and a variety of compounds which become oxides, for example, suitably selected from carbonate, nitrate, hydroxides, organic metal compounds, etc. can be mixed to use. A content of the dielectric material in the dielectric layer paste may be 15 to 50 wt % or so.

As the binding agent, which is not particularly limited, a variety of binders, such as a cellulosic resin, butyral system resin, acrylic resin, olefinic system resin urethane system resin and styrene system resin, can be used. A content of the binding agent in the dielectric layer paste is not particularly limited and may be 1 to 15 wt % or so.

Additives selected from a variety of dispersants, plasticizers, etc. may be included in accordance with need in the dielectric layer paste.

The internal electrode layer paste is for forming the internal electrode layers 3 (refer to FIG. 1) and prepared by kneading the above conductive material, etc. with the above binding agent. A content of the binding agent in the internal electrode paste is not particularly limited and may be a normal content of, for example, 1 to 15 wt % or so. A content of the conductive material in the internal electrode paste may be 40 to 60 wt %. Additives selected from a variety of dispersants, plasticizers, dielectrics, insulating materials, etc. may be included in accordance with need in the internal electrode paste.

The external electrode paste is prepared in the same way as the internal electrode paste.

When using a printing method, the dielectric layer paste and the internal electrode paste of a predetermined pattern are printed by stacking on a substrate of polyethylene terephthalate, etc., cut to be a predetermined shape, then, removed from the substrate so as to obtain a green chip. While, when using a sheet method, a green sheet is formed by using the dielectric layer paste, printing the internal electrode paste by a predetermined pattern thereon, then, stacking so as to obtain a green chip. Note that a thickness of the formed dielectric green sheet is suitably determined in accordance with the thickness of the dielectric layer 2 explained above. A thickness of the internal electrode pattern is suitably determined in accordance with the thickness of the internal electrode layer 3 explained above.

Next, the obtained green chip is subjected to binder removing and firing processing.

An atmosphere at the time of the binder removing processing of the green chip is not particularly limited and the processing can be performed in a variety of atmospheres, for example, in the air, in a wet nitrogen gas atmosphere, or a mixed gas of wet nitrogen and hydrogen, etc. If the binder removing processing is insufficient before firing, cracks and other structural defaults easily arise during main firing due to residual carbon. Thus, it is necessary that the binder removing processing is sufficiently performed prior to the firing. Note that an object of the binder removing processing is absolutely to remove a binder from the green chip and not to sinter the dielectric. Therefore, normally the binder is sufficiently removed when the temperature is not raised to an extent that the dielectric starts to be sintered, specifically, for example, at less than 1000° C., preferably 800° c. or less in the first invention and, for example, 800° C. or less in the second invention. The binder removing is normally performed by keeping at a predetermined temperature for about 0.5 to 24 hours. It is preferable because by doing so, the binder is sufficiently removed. In the second invention, the temperature may be once cooled to the room temperature, etc. after the binder removing so as to proceed to a firing step, or the firing step may be successively taken after the binder removing. Those characterized in the first and second inventions are all belong to the firing step after the binder removing processing.

Then, the green chip after the binder removing step is subjected to the firing step.

In the present embodiment, the firing step includes a temperature raising step, a temperature holding step and a temperature lowering step.

The temperature raising step is a step for raising an atmosphere temperature to a firing temperature. The temperature raising step is just required to raise the temperature to the firing temperature and the process is not particularly limited. To obtain the effects of the first invention, the temperature may be raised to the firing temperature at a predetermined raising rate, or the temperature may be once raised to a predetermined temperature (for example, lower than the firing temperature) and lowered from the predetermined temperature (for example, to the room temperature), then, raised to the firing temperature at a predetermined raising rate. The predetermined temperature in this case is preferably 1000° C. or more, more preferably 1150° C. or so in the first invention and preferably more than 800° C., more preferably more than 1050° C. in the second invention.

In the initial stage of the temperature raising step, the temperature is raised under an atmosphere gas using a wet nitrogen gas. In the first invention, the atmosphere makes base metals included in internal electrodes be easily oxidized. In the second invention, it is considered that sintering of dielectrics between internal electrodes and electrodes is accelerated, furthermore, plasticity of the dielectrics in the temperature holding step is increased.

Then, hydrogen is continued to be introduced from a point in time of the temperature raising step. In the first invention, the hydrogen introduction method is not particularly limited and, for example, the hydrogen of a predetermined concentration may be introduced from the beginning of the introduction, or the hydrogen may be introduced by using concentration gradient toward the predetermined concentration, such that the hydrogen concentration becomes 5 percent by volume or so at the time that a temperature of the atmosphere is raised to about 100° C. In any cases, an oxygen partial pressure in the firing atmosphere declines and the reducing state becomes strong.

In the second invention, hydrogen is continued to be introduced from a point in time of the temperature raising step and abruptly reduces the oxygen partial pressure in the firing atmosphere to make the reducing state strong at a time. As a result, oxidization of the internal electrodes is prevented. When firing is carried out by in this method, the stress caused by a difference of contraction behavior between the internal electrodes and the dielectrics generated from the temperature raising step to the temperature holding step can be released by plastic strain of the dielectrics. Therefore, it is considered that an occurrence of cracks is suppressed.

Note that since the oxygen partial pressure widely changes in accordance with a temperature, hydrogen concentration and a temperature of a wetter, it is important to carefully control them. For example, in the case of introducing no hydrogen (0%) and the case of introducing hydrogen by 5% at 50° C., the oxygen partial pressures are about $1\times10^{-21}$ Pa and about $4\times10^{-70}$ Pa, respectively, that is, the difference becomes nearly 50 digits. Also at 500° C., in the case of introducing 0% of hydrogen and the case of 5% of hydrogen, the oxygen partial pressures are about $3\times10^{-6}$ Pa and about $6\times10^{-24}$ Pa, that is, the difference becomes more than 10 digits. Furthermore, at 1100° C. also, in the case of introducing 0% of hydrogen and the case of 5% of hydrogen, the oxygen partial pressures are about $2\times10^{-1}$ Pa and about $2\times10^{-9}$ Pa, that is, the difference becomes 8 digits.

In the firing methods of the first and second inventions, it is characterized that preferably the oxygen partial pressure is abruptly changed by at least 6 digits in a specified temperature range. Namely, it is preferable to introduce hydrogen so that a difference of oxygen partial pressures before and after the hydrogen introduction becomes 6 digits or more at the temperature of the hydrogen introduction.

Note that the oxygen partial pressure can be also changed by changing the temperature of the wetter. However, in this method, it is difficult to change the oxygen partial pressure by 6 digits or more particularly at a high temperature of 1000° C. or more and the effects in the first and second inventions cannot be obtained.

Note that the atmosphere after the hydrogen introduction preferably includes nitrogen as a main component and is wetted by a vapor pressure of 1 to 10 percent by volume of hydrogen and 0 to 50° C. in the first invention. While in the second invention, it is preferable to include nitrogen as a main component and is wetted by a vapor pressure of 0.1 to 10 percent by volume of hydrogen and 0 to 70° C. For example, a wetter, etc. can be used for wetting. The wetter temperature may be the same or different before and after the beginning of the hydrogen introduction.

In the first invention, it is characterized that Ni is intentionally oxidized. Generally, deterioration of characteristics and occurrence of structural defaults are liable to be caused due to oxidization of Ni during firing, so firing is carried out while suppressing oxidization of Ni. However, in the first invention, sintering of Ni can be made slow by oxidizing Ni to a certain extent. After that, the oxidized base metal can be abruptly reduced by introducing hydrogen. As a result, the base metal (for example, Ni) contained in the internal electrodes can be prevented from becoming spheroidized, expansion in a direction of stacked layers, which is noticeable when stacking a great number of layers, can be effectively suppressed and a multilayer ceramic capacitor 1 having less structural defaults can be produced. Moreover, the dielectric constant (static capacitance) of the obtained multilayer ceramic capacitor 1 is increased and inferiority of insulation resistance (IR) can be improved.

In the second invention, the initial stage of the temperature raising step is carried out under an atmosphere gas using a wet nitrogen gas and sintering of the internal electrodes and the dielectrics is accelerated, so plasticity of the dielectrics is increased. After that, hydrogen is introduced and oxidization of base metal internal electrodes is prevented. As a result, a multilayer ceramic capacitor 1 having dielectric layers of a specific composition wherein an occurrence of cracks and other structural defaults are suppressed can be produced.

In the first invention, in the case of raising the temperature to the firing temperature at a predetermined raising rate, the temperature of hydrogen introduction is not particularly limited, but it is preferably 1000° C. or more, more preferably 1100° C. or more, and still more preferably 1150° C. or more. By setting the lower limit of the temperature of the hydrogen introduction at 1000° C., an improvement in a defective fraction of insulation resistance (IR) of the obtained capacitor 1 can be expected. There is a tendency that the more the number of stacked layers, the more noticeable deterioration of insulation resistance, however, by starting hydrogen introduction at 1000° C. or more, deterioration of the insulation resistance is prevented even in a multilayer product having 300 layers or more. Namely, by setting the temperature at the time of starting the hydrogen introduction at 1000° C., effects particularly in the case where a great number of layers are stacked can become remarkable.

Note that in the first invention, in the case where the temperature is not raised to the firing temperature at a predetermined raising rate but once raised to a predetermined temperature (for example, 1150° C. or so), which is lower than the firing temperature, lowered from the predetermined temperature to, for example, the room temperature, and then, hydrogen is introduced, the temperature of the hydrogen introduction is not particularly limited, so the hydrogen introduction may be performed before a base metal included in the internal electrodes is oxidized. The temperature may be, for example, the room temperature (25° C. or so). In the same way, the temperature at the time of introducing hydrogen after once raising and lowering the temperature to predetermined temperatures may be the room temperature. The reason thereof is not exactly clear, but it is deemed that it is because oxidization of internal electrodes progresses and sintering of dielectric layers progresses by raising the temperature to the predetermined temperature without introducing any hydrogen.

In the first invention, it is also preferable to hold the temperature of hydrogen introduction, for example, for 0 to 180 minutes or so, preferably 0 to 120 minutes or so.

On the other hand, in the first invention, when introducing hydrogen after reaching to the firing temperature (a sintering temperature of the dielectrics) or introducing hydrogen for the first time from a point in time of the temperature lowering step, sintering of the dielectric layers becomes insufficient, which may lead to deterioration of characteristics. Therefore, the upper limit of the temperature at the time of starting the hydrogen introduction is preferably the firing temperature (at the time when the temperature reached the firing temperature through the temperature raising step and before entering into the temperature holding step).

In the second invention the temperature of hydrogen introduction is preferably over 800° C., more preferably over 1050° C., and still more preferably over 1200° C. By setting the lower limit of the temperature of the hydrogen introduction at more than 800° C., a reduction of internal cracks and other structural defaults of the capacitor 1 can be expected. The occurrence of internal cracks tends to increase as the number of stacked layer increases, however, the occurrence of internal cracks is suppressed even in a product wherein a great number of layers are stacked by starting the hydrogen introduction at over 800° C. Namely, by setting the temperature of starting the hydrogen introduction at over 800° C., the effects can become more remarkable when the number of dielectric layers is great.

On the other hand, in the second invention, when hydrogen is introduced after entering into the temperature holding step, breaks often occur in the internal electrodes and internal electrode components are dispersed in the dielectric layers, which may lead to deterioration of characteristics. Accordingly, the upper limit of the temperature of starting the hydrogen introduction is preferably the firing temperature (at the time the temperature reached the firing temperature in the temperature raising step and before entering into the temperature holding step).

Both in the first and second inventions, the temperature raising rate is preferably 50 to 500° C./hour, more preferably 200 to 300° C./hour. In the second invention, when the temperature raising rate is too slow, it takes too much time for firing and the productivity may decline. While when the temperature raising rate is too fast, delamination and other defaults may occur.

The temperature holding step is for holding the temperature at the above firing temperature. In the temperature holding step, it is preferable that the above atmosphere is not changed and that the firing temperature is kept for a certain time under a mixed gas atmosphere of wet nitrogen gas and hydrogen gas.

The firing temperature is normally a sintering temperature of the dielectrics and preferably 1000 to 1400° C., more preferably 1150 to 1350° C. in the first invention and 1200 to 1380° C. in the second invention. Both in the first and second inventions, when the firing temperature is too low, a sintered body cannot be made sufficiently fine. While when the firing temperature is too high, in the first invention, capacity-temperature characteristics of the obtained multilayer ceramic capacitor 1 is declined as a result of breaks of electrodes or dispersion of materials composing the internal electrodes caused by abnormal sintering of the internal electrodes. In the second invention, electric characteristics of the obtained multilayer ceramic capacitor 1 deteriorates as a result of breaks of electrodes or dispersion of materials composing the internal electrodes caused by abnormal sintering of the internal electrodes.

A holding time of the firing temperature is preferably 0.5 to 8 hours, more preferably 1 to 3 hours in the first invention and 0.5 to 16 hours, more preferably 1 to 12 hours in the second invention.

The temperature lowering step is a step for lowering the temperature from the above firing temperature. In the temperature lowering step, the temperature may be lowered in the mixed gas atmosphere of a wet nitrogen gas and hydrogen gas without changing the atmosphere in the above temperature holding step, or the atmosphere may be changed from a point in time of the temperature lowering step. When changing the atmosphere, it is changed to an atmosphere gas using a wet nitrogen gas by stopping from a point in time of the temperature lowering step the hydrogen continued to be introduced from a point in time of the above temperature raising step. Namely, the temperature may be lowered under a mixed gas atmosphere of wet nitrogen and hydrogen until a point in time of the temperature lowering step, and then in the wet nitrogen gas atmosphere by stopping the hydrogen introduction from a point in time of the temperature lowering step. By doing so, the oxygen partial pressure is increased to heighten an oxidizing state, consequently, annealing effects of the dielectric layers can be obtained.

When stopping the hydrogen introduction, the temperature is preferably 1100° C. or less, more preferably 1050° C. or less in the first invention. By setting the upper limit of the temperature of stopping the hydrogen introduction, annealing effects can be effectively obtained. Also, it is preferably 1200° C. or less, more preferably 1000° C. or less in the second invention. By setting the upper limit of the temperature of stopping the hydrogen introduction, oxidization of the internal electrodes and dispersion of internal electrode components into the dielectric layers can be prevented.

The temperature lowering rate is preferably 50 to 500° C./hour, more preferably 200 to 300° C./hour. When the temperature lowering rate is too slow, productivity is liable to decline, while when the temperature lowering rate is too fast, cracks may occur due to a heat-shock, etc.

It is preferable that annealing (heat treatment) is performed on a chip sintered body after the firing step, but it is not always necessary. Note that when the annealing effects are obtained in the above temperature lowering step, annealing thereafter becomes unnecessary. The annealing is processing for re-oxidizing the dielectric layers, and thereby, insulation resistance of the capacitor 1 can be increased.

An oxygen partial pressure of the annealing atmosphere is preferably $10^{-4}$ Pa or more, more preferably $10^{-1}$ to 10 Pa. When the oxygen partial pressure is too low, the dielectric layers 2 are hard to be re-oxidized, while when the oxygen partial pressure is too high, the internal electrode layers 3 are liable to be oxidized.

A holding temperature at the time of annealing is preferably 1100° C. or less, more preferably 500 to 1100° C. in the first invention, and 1200° C. or less, more preferably 500 to 1100° C. in the second invention. When the holding temperature is too low, re-oxidization of the dielectric layers becomes insufficient, insulation resistance declines and its accelerated lifetime is liable to be short. While, when the holding temperature is too high, not only the internal electrodes are oxidized and the capacity declines, but reaction with a dielectric base arises and capacity-temperature characteristics, insulation resistance and its accelerated lifetime are liable to be deteriorated. Note that annealing can be composed only of a temperature raising step and a temperature lowering step. In this case, the temperature holding time is zero, and the holding time and the highest temperature are synonymous.

Annealing conditions other than the above are preferably the temperature holding time is set to be 0 to 20 hours, more preferably 1 to 10 hours, a cooling rate is set to be 50 to 500° C./hour, more preferably 100 to 300° C., and, for example, a wet nitrogen gas is introduced as an atmosphere gas of the annealing.

Note that in the same way as in the above firing, to wet a nitrogen gas or a mixed gas in the above binder removing and annealing processing, for example, a wetter, etc. can be used and a water temperature at this time is preferably 5 to 75° C.

The binder removing processing, firing and annealing may be successively performed or separately performed.

An obtained capacitor sintered body is subjected to end surface polishing, for example, by barrel polishing or sand-blast, printed or transferred an external electrode paste and fired to form the external electrodes 6 and 8. Firing conditions of the external electrode paste are preferably, for example, at 600 to 800° C. for 10 minutes to 1 hour or so using a mixed gas of a wet nitrogen gas and hydrogen gas. On surfaces of a pair of external electrodes 4 may be formed a coating layer (pad layer) by soldering, etc. in accordance with need.

The thus obtained multilayer ceramic capacitor 1 is mounted on a printed circuit board by soldering, etc. and used in a variety of electronic equipments.

According to the first invention, expansion in the stacked layer direction, which is noticeable when the number of stacked layers is great, can be suppressed and a multilayer ceramic capacitor 1 having less structural defaults can be produced. Moreover, according to the first invention, the dielectric constant (static capacitance) of the obtained multilayer ceramic capacitor 1 increases and inferiority of insulation resistance (IR) improves.

According to the second invention, expansion in the stacked layer direction, which is noticeable when the number of stacked layers is great, can be suppressed and a multilayer ceramic capacitor 1 having dielectric layers of a specific composition, by which internal cracks and other structural defaults are less, can be produced.

Embodiments of the present invention were explained above, but the present invention is not limited to the embodiments and can be embodied in a variety of ways within the scope of the present invention.

For example, in the above embodiments, a multilayer ceramic capacitor was taken as an example of a multilayer ceramic electronic device according to the present invention, but the multilayer ceramic electronic device according to the present invention is not limited to a multilayer ceramic capacitor and may be any devices having a body made by alternately stacking dielectric layers and internal layers.

Next, examples wherein the embodiment of the present invention is described more specifically will be used for explaining the present invention further in detail. Note that the present invention is not limited to the embodiments.

EXAMPLE 1

First, a dielectric layer paste was prepared as described below.

As starting materials, powders of $BaCO_3$, $CaCO_3$, $TiO_2$, $ZrO_2$, $MnCO_3$, $SiO_2$, $Y_2O_3$, etc. having a particle diameter of 0.1 to 1 μm were used.

These powders were mixed to be a composition of 100 mole % by a composition formula $\{(Ba_{0.95}Ca_{0.05})(Ti_{0.8}Zr_{0.2})O_3\}$ as materials wherein a part of $BaTiO_3$ is replaced by Ca and Zr by firing, 0.2 mole % in a conversion of MnO, 0.16 mole % in a conversion of $SiO_2$ and 0.3 mole % in a conversion of $Y_2O_3$, subjected to wet mixing using a ball mill for 16 hours and dried to obtain a dielectric material.

A paste was obtained by mixing by using a ball mill 100 parts by weight of the obtained dielectric material, 4.8 parts by weight of acrylic resin, 40 parts by weight of methylene chloride, 20 parts by weight of trichloroethane, 6 parts by weight of mineral spirits and 4 parts by weight of acetone.

Next, an internal electrode paste was prepared as described below. A paste was obtained by kneading by using a triple-roll 100 parts by weight of Ni particle having an average particle diameter of 0.8 μm, 40 parts by weight of organic vehicle (8 parts by weight of an ethyl cellulose resin is dissolved in 92 parts by weight of butyl carbitol) and 10 parts by weight of butyl carbitol.

Next, an external electrode paste was prepared as described below. A paste was obtained by kneading 100 parts by weight of Cu particle having an average particle diameter of 0.5 μm, 35 parts by weight of organic vehicle (8 parts by weight of an ethyl cellulose resin is dissolved in 92 parts by weight of butyl carbitol) and 7 parts by weight of butyl carbitol.

Next, the above dielectric layer paste was used for forming a green sheet of a thickness of 6 μm on a PET film, the internal electrode paste was printed by a predetermined pattern thereon, and then, the green sheet was removed from the PET film.

Next, the green sheets and protective green sheets (on which the internal electrode paste is not printed) were stacked and pressured to obtain a green chip. The number of stacked layers in the sheet having the internal electrodes were 100.

Then, the green chip is cut to a predetermined size and subjected to a binder removing step, firing step and annealing (heat treatment) to obtain a multilayer ceramic sintered body.

The binder removing processing was performed under conditions below.
 temperature raising time: 15° C./hour
 holding temperature: 280° C.
 holding time: 8 hours
 atmosphere: in the air Firing was performed under conditions below.

First, the temperature was raised from the room temperature (25° C.) to 1100° C. at a temperature raising rate of 200° C./hour under an atmosphere gas using a wet nitrogen gas (an oxygen partial pressure was $10^{-1}$ Pa or so). Then, hydrogen introduction was started at 1100° C. to change to a mixed gas atmosphere of a wet nitrogen gas and hydrogen gas (5 percent by volume of $H_2$, and the oxygen partial pressure was $10^{-8}$ Pa or so). The temperature was raised to the firing temperature of 1220° C. under the atmosphere.

Next, firing was performed by holding the firing temperature of 1220° C. for 2 hours without changing the atmosphere.

Then, the temperature was lowered to the room temperature (25° C.) at a temperature lowering rate of 200° C./hour without changing the atmosphere.

Annealing was performed under conditions below.
 holding temperature: 1000° C.
 holding time: 3 hours
 temperature lowering rate: 300° C./hour
 atmosphere: wet nitrogen gas
 (oxygen partial pressure was $10^{-1}$ Pa)

Note that to wet the atmosphere gas at the time of firing and annealing, a wetter with a water temperature of 20° C. was used.

Next, after polishing end surfaces of the multilayer ceramic sintered body by sandblast, the external electrode paste was transferred to the end surfaces, and external electrodes were formed by firing at 800° C. for 10 minutes under a mixed gas atmosphere of a wet nitrogen gas and hydrogen gas to obtain multilayer ceramic capacitor samples having a composition shown in FIG. 1.

The obtained capacitor samples had a size of 3.2 mm×1.6 mm×0.6 mm, wherein the number of dielectric layers sandwiched by two internal electrodes was 100, a thickness thereof was 3 μm and the thickness of the internal electrode layers was 1.5 μm.

Static capacitance, a defective fraction of insulation resistance (IR) and shape anisotropy of the obtained capacitor samples were evaluated, respectively.

The static capacitance (μF) was obtained by measuring static capacitance of 10 capacitor samples at a reference temperature of 25° C. by a digital LCR meter (4274A made by YHP Company) under conditions of a frequency of 120 Hz and an input signal level (measurement voltage) of 0.5 Vrms and calculating an average value thereof. The result was 13 μF.

The defective fraction (%) of insulation resistance (IR) was obtained by using 100 capacitor samples. Those fell into IR<$1\times10^8$ U were judged to be defective and a ratio of the defective in all quantity was obtained by a percentage to be used as the defective fraction. The result was 50%. Note that the insulation resistance (IR) was measured by using an insulation resistance tester (R8340A made by Advantest Corporation) after applying a DC of 10V to the capacitor samples for 60 seconds at 25° C.

The shape anisotropy was obtained by respectively measuring a maximum thickness (b) and a minimum thickness (a) of 20 capacitor samples, calculating by a formula $\{(b-a)/a\}\times 100$ a ratio (%) that a thickness difference differs and obtaining an average thereof. When the value was less than 6%, "○" was given, while "x" was given when 6% or more. As a result, the present example was given "○" and no shape anisotropy was observed.

EXAMPLE 2

Capacitor samples were obtained in the same way as in the Example 1 except that hydrogen introduction was started at the time the temperature was raised to 1150° C. in the firing step. Evaluation was made in the same way as in the Example 1.

As a result, the static capacitance of the obtained capacitor samples was 15 μF and the capacity was confirmed to be increased comparing with the Example 1. The defective fraction of insulation resistance (IR) of the capacitor samples was 0% and the IR defective fraction was confirmed to be drastically improved comparing with the Example 1. The shape anisotropy of the capacitor samples was "○" and no shape anisotropy was observed.

EXAMPLE 3

Capacitor samples were obtained in the same way as in the Example 1 except that hydrogen introduction was started at the time the temperature was raised to 1220° C. in the firing step. Evaluation was made in the same way as in the Example 1.

As a result, the static capacitance of the obtained capacitor samples was 14 μF and the capacity was increased comparing with the Example 1. While, when comparing with the Example 2, a little decrease in the capacity was confirmed. The reason is not exactly clear, but it is deemed that it is because when hydrogen introduction starts at the time of reaching the firing temperature, sintering of the dielectrics tends to be insufficient, and thereby, the capacity decreases.

The defective fraction of insulation resistance (IR) of the capacitor samples was 0% and the IR defective fraction was confirmed to be drastically improved comparing with the Example 1. The shape anisotropy of the capacitor samples was "○" and no shape anisotropy was observed.

COMPARATIVE EXAMPLE 1

Capacitor samples were obtained in the same way as in the Example 1 except that hydrogen introduction was started from the beginning of temperature raising at the room temperature (25° C.) and the atmosphere was a mixed gas of a wet nitrogen and hydrogen in the firing step. Evaluation was made in the same way as in the Example 1.

As a result, the static capacitance of the obtained capacitor samples was 11 μF. The defective fraction of insulation resistance (IR) of the capacitor samples was 95%. The shape anisotropy of the capacitor samples was "x". The respective evaluations were inferior to those of the Examples 1 to 3, and superiority of the Examples 1 to 3 was confirmed.

COMPARATIVE EXAMPLE 2

Capacitor samples were obtained in the same way as in the Example 1 except that hydrogen introduction was started at the time the temperature was raised to 800° C. in the firing step. Evaluation was made in the same way as in the Example 1.

As a result, the static capacitance of the obtained capacitor samples was 11 μF. The defective fraction of insulation resistance (IR) of the capacitor samples was 95%. The shape anisotropy of the capacitor samples was "x". The respective evaluations were inferior to those of the Examples 1 to 3, and superiority of the Examples 1 to 3 was confirmed.

EXAMPLE 4

Capacitor samples were obtained in the same way as in the Example 1 except that the number of dielectric layers sandwiched between two internal electrode layers was 500. Evaluation was made in the same way as in the Example 1.

As a result, the static capacitance of the obtained capacitor samples was 74 μF. The defective fraction of insulation resistance (IR) of the capacitor samples was 50%. The shape anisotropy of the capacitor samples was "○" and no shape anisotropy was observed.

EXAMPLE 5

Capacitor samples were obtained in the same way as in the Example 2 except that the number of dielectric layers sandwiched between two internal electrode layers was 500. Evaluation was made in the same way as in the Example 2.

As a result, the static capacitance of the obtained capacitor samples was 80 μF and the capacity was confirmed to be increased comparing with that of the Example 4. The defective fraction of insulation resistance (IR) of the capacitor samples was 0% and the IR defective fraction was confirmed to be drastically improved comparing with the Example 4. The shape anisotropy of the capacitor samples was "○" and no shape anisotropy was observed.

EXAMPLE 6

Capacitor samples were obtained in the same way as in the Example 3 except that the number of dielectric layers sandwiched between two internal electrode layers was 500. Evaluation was made in the same way as in the Example 3.

As a result, the static capacitance of the obtained capacitor samples was 78 μF and the capacity was increased comparing with that of the Example 4. While, a little decrease in capacity was confirmed comparing with the Example 5. It is deemed that it is because when hydrogen introduction starts at the time of reaching the firing temperature, sintering of the dielectrics tends to be insufficient, and thereby, the capacity decreases. The defective fraction of insulation resistance (IR) of the capacitor samples was 0% and the IR defective fraction was confirmed to be drastically improved comparing with the Example 4. The shape anisotropy of the capacitor samples was "○" and no shape anisotropy was observed.

COMPARATIVE EXAMPLE 3

Capacitor samples were obtained in the same way as in the Comparative Example 1 except that the number of dielectric layers sandwiched between two internal electrode layers was 500. Evaluation was made in the same way as in the Comparative Example 1.

As a result, the static capacitance of the obtained capacitor samples was 62 μF. The defective fraction of insulation resistance (IR) of the capacitor samples was 100%. The shape anisotropy of the capacitor samples was "x". The respective evaluations were inferior to those of the Examples 4 to 6, and superiority of the Examples 4 to 6 was confirmed.

COMPARATIVE EXAMPLE 4

Capacitor samples were obtained in the same way as in the Comparative Example 2 except that the number of dielectric layers sandwiched between two internal electrode layers was 500. Evaluation was made in the same way as in the Comparative Example 2.

As a result, the static capacitance of the obtained capacitor samples was 62 μF. The defective fraction of insulation resistance (IR) of the capacitor samples was 100%. The shape anisotropy of the capacitor samples was "x". The respective evaluations were inferior to those of the Examples 4 to 6, and superiority of the Examples 4 to 6 was confirmed.

EXAMPLE 7

The number of dielectric layers sandwiched between two internal electrode layers was 500. Hydrogen introduction was stopped at the time the temperature was lowered to 1100° C. in the temperature lowering step in the firing step, the atmosphere was changed to a wet nitrogen gas (oxygen partial pressure was $10^{-1}$ Pa or so) and the temperature was lowered to the room temperature (25° C.). Furthermore, annealing was not performed. Except for the above, capacitor samples were obtained in the same way as in the Example 6. Evaluation was made in the same way as in the Example 6.

As a result, the static capacitance of the obtained capacitor samples was 80 μF. The defective fraction of insulation resistance (IR) of the capacitor samples was 0%. The shape anisotropy of the capacitor samples was "○" and no shape anisotropy was observed.

EXAMPLE 8

First, the temperature was raised from the room temperature (25° C.) to 1150° C. at a temperature raising rate of 200° C./hour under an atmosphere gas using a wet nitrogen gas (oxygen partial pressure was $10^{-1}$ Pa or so), kept for 60 minutes, and then lowered to the room temperature (25° C.). After that, hydrogen introduction was started and the atmosphere was changed to a mixed gas of a wet nitrogen and hydrogen (5 percent by volume of $H_2$). The temperature was raised to the firing temperature of 1220° C. at a temperature raising rate of 200° C./hour under the atmosphere. Then, after performing firing by holding the firing temperature of 1220° C. for 2 hours without changing the atmosphere, the temperature was lowered to the room temperature (25° C.) at a temperature lowering rate of 200° C./hour. Except for the above, capacitor samples were obtained in the same way as in the Example 1.

As a result, the static capacitance of the obtained capacitor samples was 14 μF. The defective fraction of insulation resistance (IR) of the capacitor samples was 0%. The shape anisotropy of the capacitor samples was "○" and no shape anisotropy was observed.

EXAMPLE 10

Capacity samples were obtained in the same way as in the Example 1 except for starting the hydrogen introduction at 1150° C. by using concentration gradient of attaining 5 percent by volume (oxygen partial pressure was $10^{-8}$ Pa or so) at the time that a temperature is 1220° C. Evaluation was made in the same way as in the Example 1.

As a result, the static capacitance of the obtained capacitor samples was 15 μF. The defective fraction of insulation resistance (IR) of the capacitor samples was 0%. The shape anisotropy of the capacitor samples was "○" and no shape anisotropy was observed.

The results are listed in Table 1.

|  | hydrogen introduction temperature ° C. | number of stacked layers in dielectric layers | static capacitance μm | IR defective fraction | shape anisotropy |
|---|---|---|---|---|---|
| Example 1 | 1100 | 100 | 13 | 50 | ○ |
| Example 2 | 1150 | 100 | 15 | 0 | ○ |
| Example 3 | 1220 | 100 | 14 | 0 | ○ |
| Comparative Example 1 | 25 | 100 | 11 | 95 | x |
| Comparative Example 2 | 800 | 100 | 11 | 95 | x |
| Example 4 | 1100 | 500 | 74 | 50 | ○ |
| Example 5 | 1150 | 500 | 80 | 0 | ○ |
| Example 6 | 1220 | 500 | 78 | 0 | ○ |
| Comparative Example 3 | 25 | 500 | 62 | 100 | x |
| Comparative Example 4 | 800 | 500 | 62 | 100 | x |
| Example 7 | 1220* | 500 | 80 | 0 | ○ |
| Example 8 | 25 | 100 | 14 | 0 | ○ |
| Example 9 | 1150 | 100 | 14 | 0 | ○ |
| Example 10 | 1150 | 100 | 15 | 0 | ○ |

*hydrogen introduction was stopped when the temperature is lowered to 1100° C.

tance (IR) of the capacitor samples was 0%. The shape anisotropy of the capacitor samples was "○" and no shape anisotropy was observed.

Note that the Example 8 is accordingly the same as the Comparative Example 1 in a point that hydrogen is introduced from the room temperature (25° C.), but different from the Comparative Example 1 in points that the static capacitance, IR defective fraction and shape anisotropy are all preferable. The reason is not exactly clear but it is deemed that it is because by raising the temperature once to a predetermined temperature without introducing hydrogen, oxidization of the internal electrodes progresses and sintering of the dielectrics progresses.

EXAMPLE 9

The temperature was held at the temperature of starting the hydrogen introduction (1150° C.) for 30 minutes and raised to the firing temperature of 1220° C. Then, after performing firing by holding the firing temperature of 1220° C. for 2 hours without changing the atmosphere, the temperature was lowered to the room temperature (25° C.) at a temperature lowering rate of 200° C./hour. Except for the above, capacitor samples were obtained in the same way as in the Example 2. Evaluation was made in the same way as in the Example 2.

EXAMPLE 11

As starting materials, a dielectric material obtained by mixing so as to be a composition of 100 mole % as $BaTiO_3$ (Ba/Ti=1.000), 1.0 mole % as $Y_2O_3$, 2.0 mole % in a conversion of $(Ba_{0.58}Ca_{0.42})SiO_3$, 0.2 mole % in a conversion of $Cr_2O_3$, 1.8 mole % in a conversion of MgO, 0.06 mole % in a conversion of $V_2O_5$, performing wet mixing by a ball mill for 16 hours and drying was used.

Then, capacitor samples were obtained in the same procedure and conditions as in the Example 1 except that the hydrogen introduction temperature was 1150° C., the firing temperature was 1280° C. for 2 hours, the thickness of the dielectric layer green sheet was 5 μm and the number of stacked layers in the sheet was 280.

The obtained capacitor samples had a size of 3.2 mm×1.6 mm×0.6 mm, the number of dielectric layers sandwiched between two internal electrode layers was 280 and a thickness thereof was 3 μm.

Sections of the capacitor samples were polished, observed by an optical microscope, and the thickness of the internal electrode layer was measured by using a micrometer. The result was that the thickness of the internal electrode layer was about 1.05 μm and an increase of a thickness in the stacking direction was suppressed.

EXAMPLE 12

Capacitor samples were obtained in the same procedure and conditions as in the Example 11 except for changing the hydrogen introduction temperature to 1200° C. Evaluation was made in the same way as in the Example 11. The result was that the thickness of the internal electrode was about 1.08 μm and an increase of a thickness in the stacking direction was suppressed.

COMPARATIVE EXAMPLE 5

Capacitor samples were obtained in the same procedure and conditions as in the Example 11 except for changing the hydrogen introduction temperature to the room temperature (25° C.) as in the Comparative Example 1. Evaluation was made in the same way as in the Example 11. The result was that the thickness of the internal electrode was about 1.32 μm and an increase of a thickness in the stacking direction was not suppressed. Superiority of the Examples 11 and 12 in this point was confirmed.

The results are listed in Table 2.

TABLE 2

| | hydrogen introduction temperature ° C. | thickness of internal electrode layers after firing μm |
|---|---|---|
| Example 11 | 1150 | 1.05 |
| Example 12 | 1200 | 1.08 |
| Comparative Example 5 | 25 | 1.32 |

EXAMPLE 13

A dielectric layer paste was prepared as described below.

First, powders of $CaZrO_3$, $SrZrO_3$, $CaTiO_3$, $MnCO_3$, $Al_2O_3$, $BaCO_3$, $CaCO_3$ and $SiO_2$ were prepared as materials. The powders were mixed so as to be a composition of 100 mole % as a composition formula $\{(Ca_{0.7}Sr_{0.3})O\}(Ti_{0.03}ZrO_{0.97})O_2$, 1 mole % in a conversion of MnO, 0.2 mole % in a conversion of $Al_2O_3$ and 2.8 mole % as $\{(Ba_{06}Ca_{04})O\}SiO_2$, subjected to wet mixing by a ball mill for 16 hours and dried by a spray drier to obtain a dielectric material. Then, 100 parts by weight of the obtained dielectric material, 5.4 parts by weight of an acrylic resin, 45 parts by weight of methylene chloride, 16 parts by weight of ethyl acetate, 6 parts by weight of mineral spirits and 4 parts by weight of acetone were mixed by a ball mill to obtain a paste.

An internal electrode paste was prepared as described below.

A paste was obtained by kneading using a triple-roll 100 parts by weight of Ni particle having an average particle diameter of 0.8 μm, 35 parts by weight of organic vehicle (8 parts by weight of an ethyl cellulose resin was dissolved in 92 parts by weight of butyl carbitol) and 7 parts by weight of butyl carbitol.

Next, an external electrode paste was prepared as described below. A paste was obtained by kneading 100 parts by weight of Cu particle having an average particle diameter of 0.5 μm, 35 parts by weight of organic vehicle (8 parts by weight of an ethyl cellulose resin is dissolved in 92 parts by weight of butyl carbitol) and 7 parts by weight of butyl carbitol.

Next, the above dielectric layer paste was used for forming a green sheet of a thickness of 6.5 μm on a PET film, the internal electrode paste was printed by a predetermined pattern thereon, and then, the green sheet was removed from the PET film.

Next, a plurality of the green sheets and protective green sheets (on which the internal electrode paste is not printed) were stacked and pressured to obtain a green stacked layer body. The number of stacked layers in the sheet having the internal electrodes were 330.

Then, the green stacked layer body was cut to a predetermined size to obtain a green chip, on which a binder removing step and firing step were performed to obtain a chip sintered body.

The binder removing processing was performed under conditions below.

temperature raising time: 15° C./hour
holding temperature: 260° C.
holding time: 8 hours
atmosphere: in the air Firing was performed under conditions below.

First, the temperature was raised from the room temperature (25° C.) to 1050° C. at a temperature raising rate of 300° C./hour under an atmosphere gas using a wet nitrogen gas (an oxygen partial pressure was $10^{-2}$ to 1 Pa or so). A wetter with a water temperature of 20° C. was used for wetting the atmosphere gas. Then, hydrogen introduction was started at 1050° C. to change the atmosphere to a mixed gas of a wet nitrogen gas and hydrogen gas (5 percent by volume of $H_2$, and the oxygen partial pressure was $10^{-6}$ Pa or so). The temperature was raised to the firing temperature of 1325° C. under the atmosphere.

Next, firing was performed by holding the firing temperature of 1325° C. for 2 hours without changing the atmosphere.

Then, the temperature was lowered to the room temperature (25° C.) at a temperature lowering rate of 300° C./hour without changing the atmosphere.

Next, end surfaces of the obtained chip sintered body were barrel polished, the above external electrode paste was transferred on the chip end surfaces, firing was performed at 800° C. for 30 minutes under a wet nitrogen gas atmosphere to form external electrodes, and multilayer ceramic capacitor samples having a configuration shown in FIG. 1 were obtained.

The obtained capacitor samples had a size of 4.5 mm×3.2 mm×2.3 mm, wherein the number of dielectric layers sandwiched between two internal electrode layers was 330, a thickness thereof was 4 μm and the thickness of the internal electrode layer was 1.7 μm.

A crack occurrence rate of the obtained capacitor samples was evaluated.

The crack occurrence rate (%) was calculated as below. First, an appearance of 200 capacitor samples was observed by using an optical microscope (UFX-II made by Nikon Corporation) to confirm an existence of a crack and 30 capacitor samples not having any cracks were selected. Then, the 30 capacitor samples were buried a resin, polished by 2 mm in the direction of the lengthwise of 4.5 mm and examined an existence of an internal crack by an optical microscope, and the number of capacitor samples wherein an internal crack occurred was divided by the whole quantity (30) for indicating by percentage. As a result, the crack occurrence was 86.7%.

EXAMPLE 14

Capacitor samples were obtained in the same way as in the Example 13 except that hydrogen introduction was started at the time the temperature was raised to 1100° C., the atmosphere was changed to a mixed gas of a wet nitrogen gas and hydrogen gas, and the temperature was raised to the firing temperature of 1325° C. under the atmosphere in the firing step. A size, the number of dielectric layers and a thickness thereof, and the thickness of an internal electrode layer were the same as those in the Example 13. Then, evaluation was made in the same way as in the Example 13. As a result, the crack occurrence rate of the obtained capacitor samples was 56.7%.

EXAMPLE 15

Capacitor samples were obtained in the same way as in the Example 13 except that hydrogen introduction was started at the time the temperature was raised to 1150° C., the atmosphere was changed to a mixed gas of a wet nitrogen gas and hydrogen gas, and the temperature was raised to the firing temperature of 1325° C. under the atmosphere in the firing step. Then, evaluation was made in the same way as in the Example 13. A size, the number of dielectric layers and a thickness thereof, and the thickness of an internal electrode layer were the same as those in the Example 13. As a result, the crack occurrence rate of the obtained capacitor samples was 3.3%.

EXAMPLE 16

Capacitor samples were obtained in the same way as in the Example 13 except that hydrogen introduction was started at the time the temperature was raised to 1200° C., the atmosphere was changed to a mixed gas of a wet nitrogen gas and hydrogen gas, and the temperature was raised to the firing temperature of 1325° C. under the atmosphere in the firing step. A size, the number of dielectric layers and a thickness thereof, and the thickness of an internal electrode layer were the same as those in the Example 13. Then, evaluation was made in the same way as in the Example 13. As a result, the crack occurrence rate of the obtained capacitor samples was 0%.

EXAMPLE 17

Capacitor samples were obtained in the same way as in the Example 13 except that hydrogen introduction was started at the time the temperature was raised to 1250° C., the atmosphere was changed to a mixed gas of a wet nitrogen gas and hydrogen gas, and the temperature was raised to the firing temperature of 1325° C. under the atmosphere in the firing step. A size, the number of dielectric layers and a thickness thereof, and the thickness of an internal electrode layer were the same as those in the Example 13. Then, evaluation was made in the same way as in the Example 13. As a result, the crack occurrence rate of the obtained capacitor samples was 0%.

EXAMPLE 18

Capacitor samples were obtained in the same way as in the Example 13 except that hydrogen introduction was started at the time the temperature was raised to 1280° C., the atmosphere was changed to a mixed gas of a wet nitrogen gas and hydrogen gas, and the temperature was raised to the firing temperature of 1325° C. under the atmosphere in the firing step. A size, the number of dielectric layers and a thickness thereof, and the thickness of an internal electrode layer were the same as those in the Example 13. Then, evaluation was made in the same way as in the Example 13. As a result, the crack occurrence rate of the obtained capacitor samples was 3.3%.

EXAMPLE 19

Capacitor samples were obtained in the same way as in the Example 13 except that hydrogen introduction was started at the time the temperature was raised to 1325° C., the atmosphere was changed to a mixed gas of a wet nitrogen gas and hydrogen gas, and the firing temperature was 1325° C. under the atmosphere in the firing step. A size, the number of dielectric layers and a thickness thereof, and the thickness of an internal electrode layer were the same as those in the Example 13. Then, evaluation was made in the same way as in the Example 13. As a result, the crack occurrence rate of the obtained capacitor samples was 0%.

COMPARATIVE EXAMPLE 6

Capacitor samples were obtained in the same way as in the Example 13 except that hydrogen introduction was started at the time the temperature was raised to 800° C., the atmosphere was changed to a mixed gas of a wet nitrogen gas and hydrogen gas, and the temperature was raised to the firing temperature of 1325° C. under the atmosphere in the firing step. A size, the number of dielectric layers and a thickness thereof, and the thickness of an internal electrode layer were the same as those in the Example 13. Then, evaluation was made in the same way as in the Example 13. As a result, the crack occurrence rate of the obtained capacitor samples was 100%. Thereby, superiority of the Examples 13 to 19 was confirmed.

COMPARATIVE EXAMPLE 7

Capacitor samples were obtained in the same way as in the Example 13 except that hydrogen introduction was started from the beginning of temperature raising at the room temperature (25° C.), the atmosphere was changed to a mixed gas of a wet nitrogen gas and hydrogen gas, and the temperature was raised to the firing temperature of 1325° C. under the atmosphere in the firing step. A size, the number of dielectric layers and a thickness thereof, and the thickness of an internal electrode layer were the same as those in the Example 13. Then, evaluation was made in the same way as in the Example 13. As a result, the crack occurrence rate of the obtained capacitor samples was 100%. Thereby, superiority of the Examples 13 to 19 was confirmed.

Figure 2:
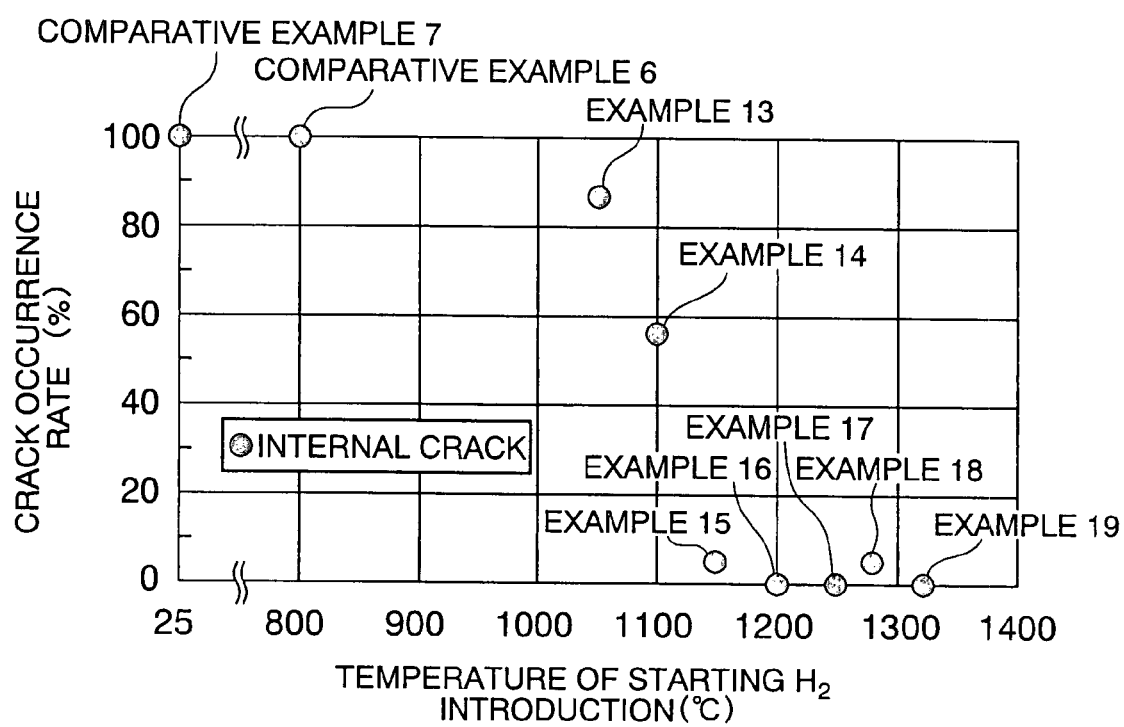
FIG. 2 is a graph of a relationship of a temperature at the time of starting hydrogen introduction and a crack occurrence rate.

The results are shown in Table 3 and FIG. 2.

TABLE 3

|  | hydrogen introduction temperature ° C. | number of stacked layers in dielectric layers | crack occurrence rate % |
|---|---|---|---|
| Example 13 | 1050 | 330 | 86.7 |
| Example 14 | 110 | 330 | 56.7 |
| Example 15 | 1150 | 330 | 3.3 |
| Example 16 | 1200 | 330 | 0 |
| Example 17 | 1250 | 330 | 0 |
| Example 18 | 1280 | 330 | 3.3 |
| Example 19 | 1325 | 330 | 0 |
| Comparative Example 6 | 800 | 330 | 100 |
| Comparative Example 7 | 25 | 330 | 100 |
| Example 20 | 25 | 330 | 0 |

From Table 3 and FIG. 2, in the case where the temperature of binder removing was 260° C. and the thickness of the green sheet was 6.2 μm, an occurrence of cracks started to be suppressed by setting the temperature of starting hydrogen introduction at more than 800° C. and was remarkably prevented by setting the temperature at more than 1050° C.

EXAMPLE 20

First, the temperature was raised from the room temperature (25° C.) to 1200° C. at a temperature raising rate of 300° C./hour under an atmosphere gas using a wet nitrogen gas (oxygen partial pressure was $10^{-1}$ Pa or so), kept for 3 minutes, and then lowered to the room temperature (25° C.). After that, hydrogen introduction was started and the atmosphere was changed to a mixed gas of a wet nitrogen gas and hydrogen gas (5 percent by volume of $H_2$). The temperature was raised to the firing temperature of 1325° C. at a temperature raising rate of 300° C./hour under the atmosphere. Then, after performing firing by holding the firing temperature of 1325° C. for 2 hours without changing the atmosphere, the temperature was lowered to the room temperature (25° C.) at a temperature lowering rate of 300° C./hour. Except for the above, capacitor samples were obtained in the same way as in the Example 13. A size, the number of dielectric layers and a thickness thereof, and the thickness of an internal electrode layer were the same as those in the Example 13. Then, evaluation was made in the same way as in the Example 13. As a result, the crack occurrence rate of the obtained capacitor samples was 0%.

The invention claimed is:

1. A method of producing a multilayer ceramic electronic device, having a firing step for firing a pre-firing element body wherein a plurality of dielectric layers and internal electrode layers containing a base metal are alternately arranged, characterized in that:
    said firing step has a temperature raising step for raising a temperature to a firing temperature;
    hydrogen is continued to be introduced from a point in time of said temperature raising step, wherein a temperature for initially introducing said hydrogen is 1000° C. or more; and
    said dielectric layer has a main component containing $BaTiO_3$.

2. The method of producing a multilayer ceramic electronic device as set forth in claim 1, wherein the hydrogen is introduced after the base metal contained in the internal electrode is oxidized, to reduce the oxidized metal.

3. A method of producing a multilayer ceramic electronic device, having a firing step for firing a pre-firing element body wherein a plurality of dielectric layers and internal electrode layers containing a base metal are alternately arranged, characterized in that:
    said firing step has a temperature raising step for raising a temperature to a firing temperature;
    hydrogen is continued to be introduced from a point in time of said temperature raising step, wherein a temperature for initially introducing said hydrogen is 1000° C. or more; and
    said dielectric layer has a main component containing $(BaCa)(TiZr)O_3$.

4. The method of producing a multilayer ceramic electronic device as set forth in claim 3, wherein the hydrogen is introduced after the base metal contained in the internal electrode is oxidized, to reduce the oxidized metal.

5. A method of producing a multilayer ceramic electronic device, having a firing step for firing a pre-firing element body wherein a plurality of dielectric layers and internal electrode layers containing a base metal are alternately arranged, characterized in that:
    said firing step has a temperature raising step for raising a temperature to a firing temperature;
    hydrogen is continued to be introduced from a point in time of said temperature raising step, wherein a temperature for initially introducing said hydrogen is 1000° C. or more; and
    said dielectric layer has a main component containing a dielectric oxide indicated by a composition formula $((Ba_{1-x}Ca_x)O)_m(Ti_{1-z}Zr_z)O_2$ wherein $0 \leq x \leq 0.25$, $0 \leq z \leq 0.30$, $1.000 \leq m \leq 1.020$;
    and said multilayer ceramic electronic device is a multilayer ceramic capacitor.

6. The method of producing a multilayer ceramic electronic device as set forth in claim 5, wherein the hydrogen is introduced after the base metal contained in the internal electrode is oxidized, to reduce the oxidized metal.

7. A method of producing a multilayer ceramic electronic device, having a firing step for firing a pre-firing element body wherein a plurality of dielectric layers and internal electrode layers containing a base metal are alternately arranged, characterized in that:
    said firing step has a temperature raising step for raising a temperature to a firing temperature;
    hydrogen is continued to be introduced from a point in time of said temperature raising step, wherein a temperature for initially introducing said hydrogen is 1000° C. or more; and
    said dielectric layer has a main component containing a dielectric oxide indicated by a composition formula $Ba_mTiO_3$ wherein $0.95 < m < 1.01$;
    and said multilayer ceramic electronic device is a multilayer ceramic capacitor.

8. The method of producing a multilayer ceramic electronic device as set forth in claim 7, wherein the hydrogen is introduced after the base metal contained in the internal electrode is oxidized, to reduce the oxidized metal.

* * * * *